United States Patent [19]
Rusterholz

[11] Patent Number: 5,864,838
[45] Date of Patent: *Jan. 26, 1999

[54] SYSTEM AND METHOD FOR REORDERING LOOKUP TABLE ENTRIES WHEN TABLE ADDRESS BITS ARE REORDERED

[75] Inventor: John T. Rusterholz, Roseville, Minn.

[73] Assignee: Cadence Design Systems, Inc., San Jose, Calif.

[*] Notice: The term of this patent shall not extend beyond the expiration date of Pat. No. 5,781,903.

[21] Appl. No.: 777,596

[22] Filed: Dec. 31, 1996

[51] Int. Cl.$^6$ .................................................. G06F 17/30
[52] U.S. Cl. .......................................... 707/101; 707/100
[58] Field of Search ........................ 707/1–10, 100–104, 707/200–206; 356/124; 382/232; 345/422; 395/500, 386

[56] References Cited

U.S. PATENT DOCUMENTS

| | | | |
|---|---|---|---|
| 5,331,394 | 7/1994 | Shalon et al. | 356/124 |
| 5,636,292 | 6/1997 | Rhoads | 382/232 |
| 5,710,834 | 1/1998 | Rhoads | 382/232 |

*Primary Examiner*—Thomas G. Black
*Assistant Examiner*—Ruay Lian Ho
*Attorney, Agent, or Firm*—Fenwick & West LLP

[57] ABSTRACT

A computer-based system and method for efficiently identifying a new index bit sequence, utilizing a single technique to rearrange any size table, generating new index bit sequences without utilizing a significant amount of memory resources, and rearranging table entries only once. A mask array defines the new index bit sequence for a new table. The mask array has N entries of N bits each where N is equal to the number of bits in the old table index. The table entries in the old table to form a new table by initializing an old table index (OI) and a new table index (NI) and setting the new table entry associated with the NI equal to the old table entry associated with the OI. Then the new index that is associated with the next old index value by using the mask array to sequentially mask bits in the NI corresponding to mask bits in the mask array is dynamically generated. Then the new table entry associated with the generated new table index value is assigned with the old table entry associated with the sequentially increased old table index. The process repeats for all values of the old index. The new table, once completed, is used in place of the old table. Accordingly, the system utilizes significantly less memory and operates more efficiently than conventional systems and methods.

19 Claims, 7 Drawing Sheets

| | New Index | Old Index | Current Entry | OldT(OI) | NewT(NI) |
|---|---|---|---|---|---|
| (a) | 0000 | 0000 | -- | A | A |
| (b) | 0000 | 0000 | 1000 | A | -- |
| (c) | 1000 | 0000 | 1000 | A | -- |
| (d) | 1000 | 0001 | 1000 | B | -- |
| (e) | 1000 | 0001 | 1000 | B | B |
| (f) | 1000 | 0001 | 1000 | B | -- |
| (g) | 0000 | 0001 | 1000 | B | -- |
| (h) | 0000 | 0001 | 0001 | B | -- |
| (i) | 0001 | 0001 | 0001 | B | -- |
| (j) | 0001 | 0010 | 0001 | C | -- |
| (k) | 0001 | 0010 | 0001 | C | C |
| (l) | 0001 | 0010 | 1000 | C | -- |
| (m) | 1001 | 0010 | 1000 | C | -- |
| (n) | 1001 | 0011 | 1000 | D | -- |
| (o) | 1001 | 0011 | 1000 | D | D |
| (p) | 1001 | 0011 | 1000 | D | -- |
| (q) | 0001 | 0011 | 1000 | D | -- |
| (r) | 0001 | 0011 | 0001 | D | -- |
| (s) | 0000 | 0011 | 0001 | D | -- |
| (t) | 0000 | 0011 | 0010 | D | -- |
| (u) | 0010 | 0011 | 0010 | D | -- |
| (v) | 0010 | 0100 | 0010 | E | -- |
| (w) | 0010 | 0100 | 0010 | E | E |

|    | YZ |    |    |    |
|----|----|----|----|----|
|    | 00 | 01 | 10 | 11 |
| 00 | A  | B  | C  | D  |
| 01 | E  | F  | G  | H  |
| 10 | I  | J  | K  | L  |
| 11 | M  | N  | O  | P  |

|    | 00 | 01 | 10 | 11 |
|----|----|----|----|----|
| 00 | A  | I  | C  | K  |
| 01 | E  | M  | G  | O  |
| 10 | B  | J  | D  | L  |
| 11 | F  | N  | H  | P  |

ZX (rows)

Z ↔ W

(b)

YX

|    | 00 | 01 | 10 | 11 |
|----|----|----|----|----|
| 00 | A  | E  | C  | G  |
| 01 | I  | M  | K  | O  |
| 10 | B  | F  | D  | H  |
| 11 | J  | N  | L  | P  |

ZW (rows)

W ↔ X

(c)

XY

|    | 00 | 01 | 10 | 11 |
|----|----|----|----|----|
| 00 | A  | C  | E  | G  |
| 01 | I  | K  | M  | O  |
| 10 | B  | D  | F  | H  |
| 11 | J  | L  | N  | P  |

ZW (rows)

X ↔ Y

|  (ZWXY) NI |  (WXYZ) OI |
|---|---|
| 0 0 0 0 | 0 0 0 0 |
| 1 0 0 0 | 0 0 0 1 |
| 0 0 0 1 | 0 0 1 0 |
| 1 0 0 1 | 0 0 1 1 |
| 0 0 1 0 | 0 1 0 0 |
| 1 0 1 0 | 0 1 0 1 |
| 0 0 1 1 | 0 1 1 0 |
| 1 0 1 1 | 0 1 1 1 |
| 0 1 0 0 | 1 0 0 0 |
| 1 1 0 0 | 1 0 0 1 |
| 0 1 0 1 | 1 0 1 0 |
| 1 1 0 1 | 1 0 1 1 |
| 0 1 1 0 | 1 1 0 0 |
| 1 1 1 0 | 1 1 0 1 |
| 0 1 1 1 | 1 1 1 0 |
| 1 1 1 1 | 1 1 1 1 |

Figure 3

|     | New Index | Old Index | Current Entry | OldT(OI) | NewT(NI) |
|-----|-----------|-----------|---------------|----------|----------|
| (a) | 0000 | 0000 | -- | A | A |
| (b) | 0000 | 0000 | 1000 | A | -- |
| (c) | 1000 | 0000 | 1000 | A | -- |
| (d) | 1000 | 0001 | 1000 | B | -- |
| (e) | 1000 | 0001 | 1000 | B | B |
| (f) | 1000 | 0001 | 1000 | B | -- |
| (g) | 0000 | 0001 | 1000 | B | -- |
| (h) | 0000 | 0001 | 0001 | B | -- |
| (i) | 0001 | 0001 | 0001 | B | -- |
| (j) | 0001 | 0010 | 0001 | C | -- |
| (k) | 0001 | 0010 | 0001 | C | C |
| (l) | 0001 | 0010 | 1000 | C | -- |
| (m) | 1001 | 0010 | 1000 | C | -- |
| (n) | 1001 | 0011 | 1000 | D | -- |
| (o) | 1001 | 0011 | 1000 | D | D |
| (p) | 1001 | 0011 | 1000 | D | -- |
| (q) | 0001 | 0011 | 1000 | D | -- |
| (r) | 0001 | 0011 | 0001 | D | -- |
| (s) | 0000 | 0011 | 0001 | D | -- |
| (t) | 0000 | 0011 | 0010 | D | -- |
| (u) | 0010 | 0011 | 0010 | D | -- |
| (v) | 0010 | 0100 | 0010 | E | -- |
| (w) | 0010 | 0100 | 0010 | E | E |

Figure 7

SYSTEM AND METHOD FOR REORDERING LOOKUP TABLE ENTRIES WHEN TABLE ADDRESS BITS ARE REORDERED

CROSS REFERENCE TO RELATED APPLICATION

This application is related to U.S. patent application Ser. No. 08/775,795 and now U.S. Pat. No. 5,781,903 filed by John T. Rusterholz on Dec. 31, 1996, entitled "System and Method for Reordering Lookup Table Entries When Table Address Bits are Inverted", Applicant's reference number 2615, which is incorporated by reference herein in its entirety.

BACKGROUND OF THE INVENTION

1. Field of the Invention

The present invention relates generally to the field of computer aided design/computer aided engineering (CAD/CAE), more particularly to the field of data array reordering in a CAD/CAE environment.

2. Description of Background Art

Computer aided design (CAD) and computer aided engineering (CAE) systems frequently increase computational speed by invoking a table (array) lookup technique. The table lookup technique is generally used to compute the results of a function having the following characteristics: (a) the function is repeated a large number of times; (b) for each computation the aggregate of the input to the function (domain) is a few bits, e.g., 4–16 bits; and (c) the output (range) can be represented by a few bytes, e.g., 1–8 bytes, for example. To implement the function, all possible results of the function (or a meaningful subset thereof) are calculated in advance and stored as a table (array) in a memory module of a computer. A methodology utilizing the table, as described below, is generated and stored in a computer readable format, e.g., as a computer program stored in a memory module of a computer, as firmware, or hardwired in computer hardware. For ease of discussion, the following description will presume the methodology is stored as a computer program. However, it will be apparent to persons skilled in the art that alternate techniques can be used to implement the computer based methodology of the present invention. The computer program catenates all of the bits that comprise the input to the function in a prescribed order, e.g., bits represented by w, x, y, z. These bits are treated as an integer in the range of zero to $2^N-1$, where N is equal to the number of input bits. This integer is used as an index (address) into the table (array) of pre-computed results. The results of the function are determined using a single memory reference to the table plus the time required to assemble the input bits. The time required to generate the results of the function using the table-lookup technique is typically significantly less than having the computer invoke the logic necessary to perform the function.

In complex CAD/CAE environments the success of the table-lookup technique frequently depends upon knowing the order of the address bits at the time the lookup-table is generated. In many computer-based disciplines the optimal order of the address bits is known when the table is generated because the address formation and the table contents are under the control of the programmer. However, in complex CAD/CAE environments, varying the sequence of the input bits can significantly alter the computational time of a CAD/CAE computer simulation, for example. Frequently, the optimal ordering of inputs is not determined until after the lookup-table and the simulation software have been generated. In this situation, it is not economically feasible to re-generate all of the, possibly thousands, of lookup-tables used in the computer program to match the new arrangement of input bits. Further complicating the problem is that the number of input bits for each lookup-table can vary significantly. What is needed is a system and method for rearranging the table entries after the table has been generated and after the computer program has been generated.

As indicated above, the rearrangement of input bits does not require the recalculation of a new lookup-table. Instead, rearranging the input bits requires merely the rearranging of the lookup-table entries. For example, an eight entry table can have an index having three address bits (x,y,z) that are catenated in order with "x" as the most significant bit. If the contents of the table can be identified as {A,B,C,D,E,F,G,H} in addresses 0–7 respectively, then x=0, y=0, z=0, yields "A", and x=1, y=1, z=1, yields "H". If it is determined that a CAD/CAE simulation will be more efficient if the three address bits are arranged as (y,x,z) when forming the address, the table entries must be rearranged into the order {A,B,E,F,C,D,G,H} in addresses 0–7 respectively.

FIG. 1 is an illustration of a table (array) having a four bit index. Each bit in the four bit index can be represented as a variable, e.g., w, x, y, and z respectively with "w" as the most significant bit. The table entries are represented as {A,B,C,D,E,F,G,H,I,J,K,L,M,N,O,P} in addresses 0–15 respectively. For example when the index (w,x,y,z) is equal to (0000), the associated table entry is "A". Similarly when the index is (1111), the associated table entry is "P". As noted above, there are circumstances when it is more efficient to modify the bit sequence. For example, in some circumstances, it may be advantageous to modify the bit sequence from (w,x,y,z) to (z,w,x,y). As described above, if the index sequence is modified the table entries must be rearranged to match the new sequence.

One conventional technique for rearranging the table entries requires the swapping of two bits at a time and processing (rearranging) the table entries for each swap. FIGS. 2(*a*)–(*c*) are illustrations of an example of a table that is rearranged using a conventional two-bit swapping technique. In this example, the original table, (old table) is the table described above with reference to FIG. 1 having the index represented as (w,x,y,z). The modified index sequence is (z,w,x,y). FIG. 2(*a*) is an illustration of a first intermediate table representing the table after swapping the "z" bit and the "w" bit and re-processing the table to match the modified index. The table index illustrated in FIG. 2(*a*) is (z,x,y,w) and the table entries are {A,I,C,K,E,M,G,O,B,J,D,L,F,N,H,P} in addresses 0–15 respectively. Each table entry is copied and, if necessary, a new table entry is substituted for an old table entry. However, since only two index bits can be swapped at one time, the current index, i.e., (z,x,y,w), does not match the index of the new table and another bit swap is required.

FIG. 2(*b*) is an illustration of a second intermediate table representing the table after swapping the "w" bit and the "x" bit of the first intermediate table and re-processing of the table to match the modified index. The table index illustrated in FIG. 2(*b*) is (z,w,y,x) and the table entries are {A,E,C,G, I,M,K,O,B,F,D,H,J,N,L,P} for addresses 0–15 respectively. However the index for the second intermediate table still does not match the index for the new table, therefore, a third swapping operation is performed. FIG. 2(*c*) is an illustration of a new table representing the table after swapping the "x" bit and the "y" bit of the second intermediate table and re-processing of the table to match the modified index. The table index illustrated in FIG. 2(*c*) is (z,w,x,y) and the table entries are {A,C,E,G,I,K,M,O,B,D,F,H,J,L,N,P}. The bit-swapping technique frequently requires each table entry to be copied (modified) multiple times, e.g., three time in the above example. This process is time consuming and is not efficient.

Another conventional technique uses an indirect mapping system to accommodate variations in address bit sequences. In this technique an index map is generated and stored in memory that maps each new index value to an old index value. FIG. 3 is an illustration of an index map generated and stored in memory according to a conventional technique. In FIG. 3 a new index (NI) corresponding to (z,w,x,y) is stored in memory and is associated with the corresponding old index (OI) (w,x,y,z). For example, a new index of (1000) corresponds to the old index of (0001) since in both indices the "z" bit is equal to a binary one. The entire index map is generated and stored in memory. In order to access a table entry a new index is identified. Then the new index is mapped to an old index. Then the table entry associated with the old index is retrieved from memory. One problem with the indirect index mapping technique is that the new table index values must be stored in memory. It is not uncommon for the size of the index to exceed sixteen bits. Storing a new index map in the memory can quickly consume a large portion of the scarce memory resources since the number of indices in the index map is $2^N$ where N is the size of the index in bits. A second problem with the indirect index mapping technique is that, as described above, it is difficult to efficiently receive the new bit sequence information. A third problem with the indirect index mapping technique is that, as described above, in order to identify a table entry, two table lookups are necessary, one map index lookup and one table entry lookup. This indirect mapping is inefficient and time consuming. A fourth problem with the indirect index mapping technique is that conventional systems pre-define the index size in order to generate the index maps. For example, in the above example, the computer-based technique used to generate the index map will only operate with four bit index values. It is possible to have techniques for reordering table entries when the number of entries (and hence the number of indicies) will always have a specific length. However, a better solution reorders the table entries when the table size is only determined at run-time, i.e., after the old table and the computer program have been generated. Accordingly, the above technique for generating and storing an index map is not an effective solution in many design environments.

What is needed is a system and method for (1) efficiently identifying a new index bit sequence; (2) utilizing a single technique to rearrange any size table; (3) generating new index it sequences without utilizing a significant amount of memory resources; and (4) rearranging table entries only once.

SUMMARY OF THE INVENTION

The invention is a computer-based system and method for efficiently identifying a new index bit sequence, utilizing a single technique to rearrange any size table, generating new index bit sequences without utilizing a significant amount of memory resources, and rearranging table entries only once. The present invention utilizes a mask array that defines the new index bit sequence for a new table. In the preferred embodiment the mask array has N entries of N bits each where N is equal to the number of bits in the old table index. The present invention rearranges the table entries in the old table to form a new table by initializing an old table index (OI) and a new table index (NI) and setting the new table entry associated with the NI equal to the old table entry associated with the OI. The present invention then dynamically generates the new index that is associated with the next old index value by using the mask array to sequentially mask bits in the NI corresponding to mask bits in the mask array. The present invention then assigns the new table entry associated with the generated new table index value with the old table entry associated with the sequentially increased old table index. The process repeats for all values of the old index. The new table, once completed, is used in place of the old table. Accordingly, the present invention utilizes significantly less memory and operates more efficiently than conventional systems and methods.

BRIEF DESCRIPTION OF THE DRAWINGS

FIG. 1 is an illustration of a table (array) having a four bit index.

FIG. 2(a) is an illustration of a first intermediate table representing the table after swapping the "z" bit and the "w" bit and re-processing the table to match the modified index.

FIG. 2(b) is an illustration of a second intermediate table representing the table after swapping the "w" bit and the "x" bit of the first intermediate table and re-processing the table to match the modified index.

FIG. 2(c) is an illustration of a new table representing the table after swapping the "x" bit and the "y" bit of the second intermediate table and re-processing the table to match the modified index.

FIG. 3 is an illustration of an index map generated and stored in memory according to a conventional technique.

FIG. 7 is a table illustrating the values generated by the preferred embodiment of the present invention when rearranging the table entries of the table illustrated in FIG. 1 to the table entries illustrated in FIG. 2(c).

DETAILED DESCRIPTION OF THE PREFERRED EMBODIMENT

A preferred embodiment of the present invention is now described with reference to the figures where like reference numbers indicate identical or functionally similar elements. Also in the figures, the left most digit of each reference number corresponds to the figure in which the reference number is first used.

Figure 4:
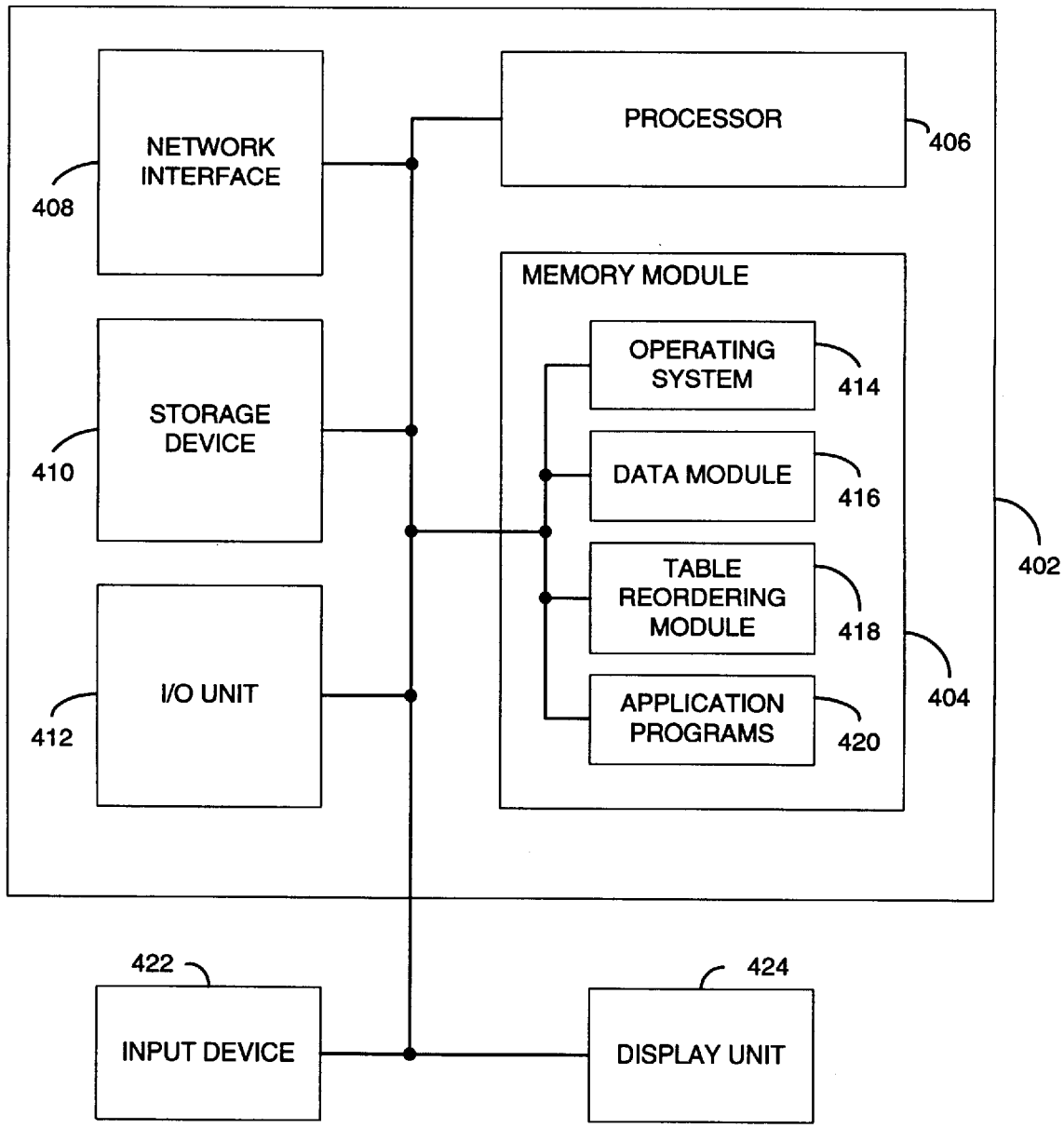
FIG. 4 is an illustration of a computer system in which the preferred embodiment of the present invention resides and operates.

FIG. 4 is an illustration of a computer system in which the preferred embodiment of the present invention resides and operates. The computer system includes a conventional computer 402, such as a SPARC Station 10 commercially available from Sun Microsystems, Santa Clara, California or a IBM compatible personal computer, e.g., commercially available from IBM Corp., Armonk, N.Y. The computer 402 includes a memory module 404, a processor 406, an optional network interface 408, a storage device, and an input/output (I/O) unit 412. In addition, an input device 422 and a display unit 424 can be coupled to the computer. The memory module 404 can be conventional random access memory (RAM) and includes a conventional operating system 414, a data module 416 for storing data, a table reordering module 418, the operation of which is described in greater detail below with respect to FIGS. 5–7, and application programs 420, for example, the Cadence Cobra CAD/CAE simulation program, commercially available from Cadence Design Systems, San Jose, Calif. Although the preferred embodiment of the present invention is described with respect to a CAD/CAE environment, it will be apparent to persons skilled in the art that the system and method of the present invention can be utilized in many different environments without departing from the scope of the present invention. The processor 406 can be a conventional microprocessor, e.g., a Pentium Pro processor commercially available from Intel Corporation, Santa Clara, Calif. The optional network interface 408, the storage device 410, and the I/O unit are all conventional. The input device 422 can be a conventional keyboard that is commercially available from Hewlett Packard, Palo Alto, Calif., or mouse, for example, that is commercially available from Logitech Incorporated, Freemont, Calif. The display unit 424 can be a conventional display monitor that is commercially available from IBM Corporation. A more detailed description of the table reordering module 418 is now set forth with respect to FIGS. 5–7. For clarity, the following description of the method of the present invention does not describe the invention at the electronic signal manipulation level of detail. It will be apparent to persons skilled in the art that the steps such as "setting" a value, for example, correspond to manipulating a signal, e.g., an electronic signal, representing the value and storing the signal in the data module 416.

Figure 5:
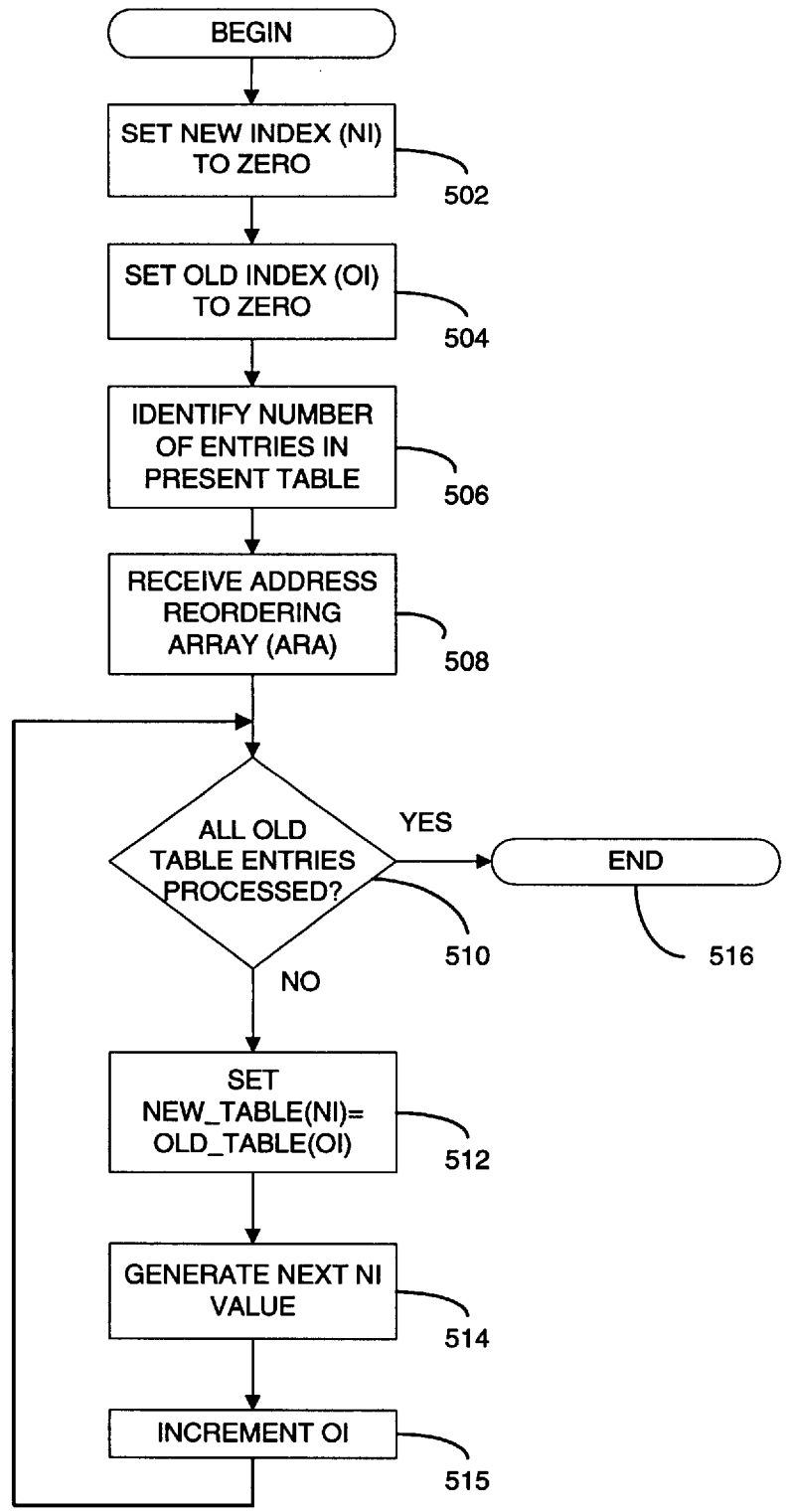
FIG. 5 is a flow chart illustrating the table rearrangement method according to the preferred embodiment of the resent invention.

FIG. 5 is a flow chart illustrating the table rearrangement method according to the preferred embodiment of the present invention. The table reordering module 418 sets 502 the value of the new index (NI) to zero and sets 504 the value of the old index to zero. The table reordering module 418 also identifies 506 the number of entries in the present table by, for example, receiving a signal representing the number of bits in the old index. The table reordering module 418 receives 508 the address reordering array (ARA) by, for example, receiving a signal generated by a user representing the reordering information. One example of the format of the ARA is described below. The table reordering module 418 then determines 510 if all of the old table entries have been processed 510, if so, the process ends 516. If not, the table reordering module 418 sets 512 the value of the new table that is associated with the new index, e.g., NewT(NI), equal to the value of the old table that is associated with the old index, e.g., OldT(OI).

The table reordering module 418 then generates 514 the next new index value, increments 515 the next old index value, and steps 510–515 are repeated until all old table entries are processed 510. A more detailed description of generating 514 the next new index value is set forth below with respect to FIGS. 6–7.

The index reordering information is encoded in the ARA. Specifically, the ARA (mask array) includes N entries, one for each of the N bits in the table index. The array entries are ordered such that the first array entry indicates the position where the least significant index bit is to be relocated. The next array entry indicates the new position for the next-to-least significant index bit, etc. The indication is accomplished in each array entry by having exactly one of its bits (the mask bit) set to a binary one. The mask bit is in the position to which the corresponding index bit is to be moved. For example, in the example described above with respect to FIGS. 1–2. If the old table index is represented as (w,x,y,z) and the new table index is represented as (z,w,x,y), the ARA is equal to the array of Table 1, where only the least significant four bits of the first four elements are shown since the number of bits in the table indices is four.

TABLE 1

ARA [0] = [1000]
ARA [1] = [0001]
ARA [2] = [0010]
ARA [3] = [0100]

The first ARA entry, ARA [0] corresponds to the "z" bit since that is the least significant bit of the old table. The first ARA entry is equal to "1000" and indicates that in the new index, the "z" bit is in the position of the fourth least significant bit. The ARA is used to generate 514 the next NI value as described below.

Figure 6:
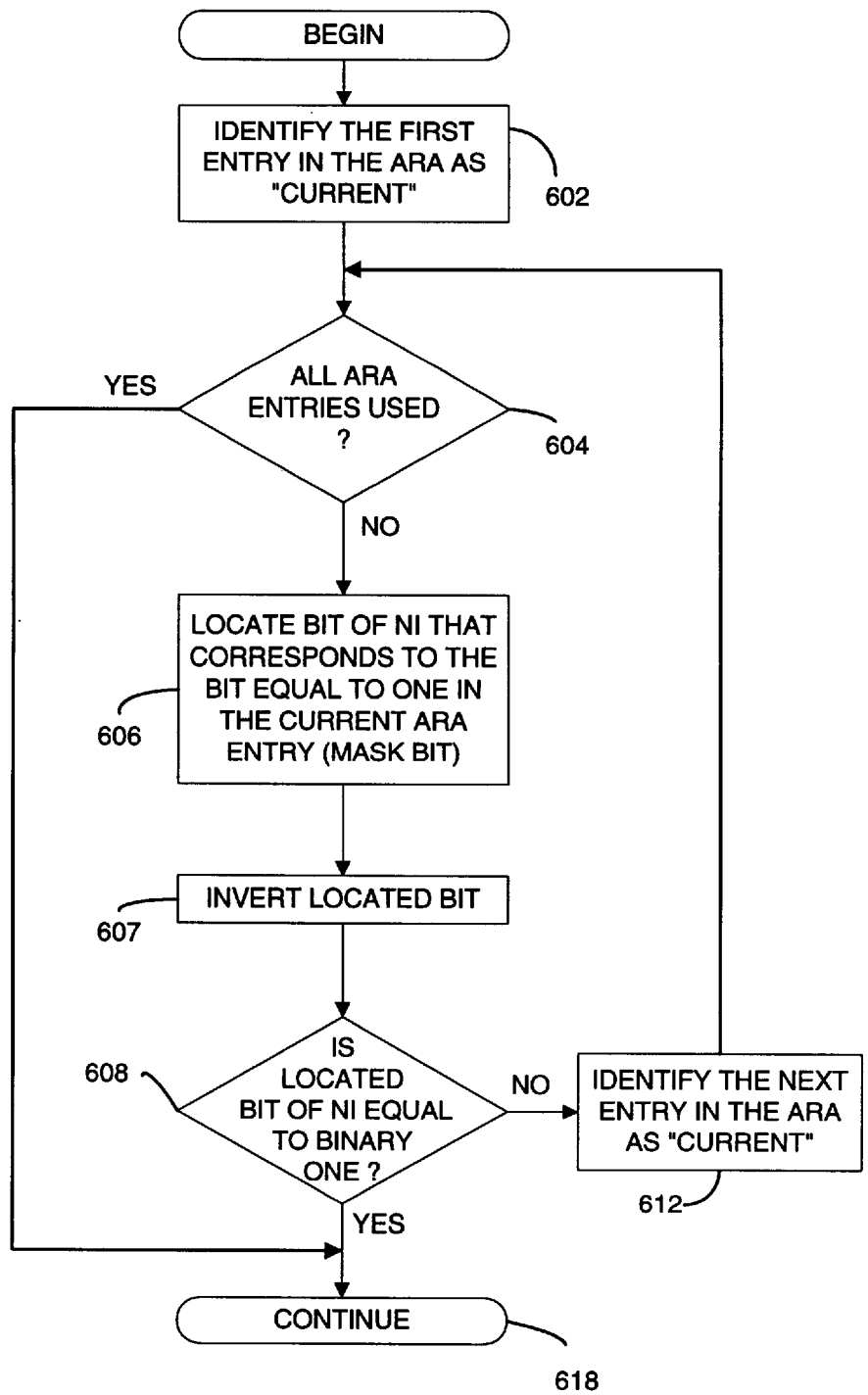
FIG. 6 is a flow chart illustrating the new index generation method according to the preferred embodiment of the present invention.

FIG. 6 is a flow chart illustrating the new index generation method according to the preferred embodiment of the present invention. The table reordering module 418 identifies 602 the first entry in the ARA as "current" and then determines 604 whether all of the ARA entries have been used. If so, the process continues 618. If not all of the ARA entries have been used, the table reordering module 418 locates 606 the bit (located bit) of the new index that corresponds to the bit equal to a binary one in the current ARA entry (mask bit). The table reordering module then inverts 607 the located bit. If 608 the inverted located bit is equal to a binary one, the process continues 618. If 608 the inverted located bit of the new index is equal to a binary zero, the table reordering module 418 identifies 612 the next entry in the ARA as the "current" entry and repeats steps 604–608. The operation of the table reordering module 418 is now described with respect to FIG. 7.

FIG. 7 is a table illustrating some of the values generated by the preferred embodiment of the present invention when rearranging the table entries of the table illustrated in FIG. 1 to the table entries illustrated in FIG. 2(c). In FIG. 7, the letter in the first column identifies the row, the values in the second column represent the four bit new index value. The values in the third column represent the four bit old index value. The values in the fourth column represent the four bit value of the "current" entry of the ARA. The values in the fifth column represent the value of the old table entry associated with old index (OldT(OI)). The values in the sixth column represent the value of the new table entry associated with new index (NewT(NI)). The example illustrated in FIG. 7 will be described with respect to the flow charts illustrated in FIG. 5 and FIG. 6.

The table reordering module 418 sets 502, 504 the new index and the old index equal to zero, identifies 506 that the number of bits in each index is four, and receives 508 the ARA. In the present example, the values of the ARA are equal to the values set forth above with respect to Table 1. Since all the old table entries have not been processed 510, the table reordering module sets NewT(NI) equal to OldT (OI). Since both NI and OI have been set to zero the result of step 512 is that NewT(0000)=A which is illustrated in row (a) of FIG. 7.

The table reordering module 418 then generates 514 the next NI value. The table reordering module 418 identifies 602 the first entry in the ARA as the "current" entry. The first value of the ARA, i.e., ARA [0], is equal to "1000". The result of step 602 is illustrated in row (b) of FIG. 7. Since all ARA entries have not been used 604, the table reordering module 418 locates 606 the bit (located bit) in the NI that corresponds to the bit equal 608 to a binary one in the current ARA entry, hereafter referred to as the mask bit. The four bit value of the new index is "0000". The located bit is the most significant bit of the four bits (the fourth bit). The table reordering module inverts 607 the located bit. That is, the table reordering module 418 sets the located bit equal to a binary one. The new index now has a value of "1000". The result of step 607 is illustrated in row (c) of FIG. 7. The table reordering module 418 determines that the located bit has a value of a binary one and the process continues 618. The table reordering module 418 increments 515 the old index. The result of step 515 is illustrated in row (d) where NI=1000, and OI=0001. The process continues with step 510. Since all of the old table entries have not been processed 510, the table reordering module 418 sets 512 NewT (1000) equal to OldT(0001). That is, the new table value associated with the index "1000" is equal to "B", as illustrated in row (e). This is consistent with the table values illustrated in FIG. 2(c). If the new index (w,x,y,z) is equal to (1000), the new table value is "B".

The table reordering module 418 then generates 514 the next NI value. The table reordering module 418 identifies the first entry in the ARA as the "current" entry. The values of the variables as a result of step 602 are illustrated in row (f). The value of the "current" entry is still "1000". Since all ARA entries have not been used, the table reordering module 418 locates 606 the bit in the NI corresponding to the mask bit. The table reordering module 418 inverts 607 the located bit. The result of step 607 is illustrated in row (g) with NI equal to "0000". The located bit (the fourth bit) in the NI is now equal to 608 a binary zero. Therefore, the table reordering module 418 identifies 612 the next entry in the ARA, e.g., ARA[1]="0001", as the "current" entry. The result of step 612 is illustrated in row (h). The table reordering module 418 then locates 606 the bit in the NI corresponding to the mask bit of the current entry (the least significant bit or the first bit). The table reordering module 418 inverts 607 the located bit. The new index is now equal to "0001" as illustrated in row (i). The located bit is equal 608 to a binary one therefore the process continues 618 and the table reordering module 418 increments 515 the OI to be equal to "0010" as illustrated in row (j). The table reordering module 418 then sets 512 NewT(0001) equal to OldT(0010). That is, NewT(0001) is equal to "C" as illustrated in row (k). This is consistent with the table values illustrated in FIG. 2(c). If the new index (w,x,y,z) is equal to (0001), the new table value is "C".

The table reordering module 418 then generates 514 the next NI value. The table reordering module 418 identifies the first entry in the ARA (1000) as the "current" entry as illustrated in row (1). The table reordering module 418 locates 606 the bit in the NI corresponding to the mask bit, e.g., the fourth bit, and inverts 607 the located bit. The new NI value is now equal to "1001", as illustrated in row (m). Since the located bit of NI is equal to 608 a binary one, the process continues 618 and the table reordering module 418 increments 515 the value of the OI to equal "0011" as illustrated in row (n). The table reordering module 418 sets 512 NewT(1001) equal to OldT(0011). That is, NewT(1001) is equal to "D" as illustrated in row (o). This is consistent with the table values illustrated in FIG. 2(c). If the new index (w,x,y,z) is equal to (1001), the new table value is "D".

The table reordering module 418 then generates 514 the next NI value. The table reordering module 418 identifies the first ARA entry (1000) as the "current" entry, as illustrated in row (p). The table reordering module 418 locates 606 the bit in the NI corresponding to the mask bit (fourth bit) and inverts 607 the located bit. The NI is now equal to "0001" as illustrated in row (q). Since the located bit is equal to 608 a binary zero, the table reordering module 418 identifies 612 the next entry in the ARA (0001) as the "current" entry, as illustrated in row (r). The table reordering module 418 locates 606 the NI bit corresponding to the mask bit (the first bit) and inverts 607 the located bit. The NI is now equal to "0000" as illustrated in row (s). Since the located bit is equal 608 to a binary zero, the table reordering module 418 identifies the next entry in the ARA (0010) as the current entry as illustrated in row (t). The table reordering module 418 locates the NI bit corresponding to the mask bit (the second bit) and inverts 607 the located bit. The NI is now equal to "0010", as illustrated in row (u). Since the located bit is equal 608 to a binary one, the process continues 618 and the table reordering module 418 increments 515 the OI to "0100", as illustrated in row (v). The table reordering module 418 sets 512 NewT(0010) equal to OldT(0100). That is, NewT(0010) is equal to "E" as illustrated in row (w). This is consistent with the table values illustrated in FIG. 2(c). If the new index (w,x,y,z) is equal to (0010), the new table value is "E". The operation of the method of the preferred embodiment for the remainder of the indices in this example will be apparent to persons of ordinary skill in the art.

One example of the implementation of the present invention using the C programming language is set forth below in Table 2.

TABLE 2

```
void trans_table(/** Function to generate the **/
                 /* mapping array */
int width,     /* input: number of bits in the address */
int *armask,                      /*input: array of masks */
int *old_table,                   /*input: the old table */
int *new_table)    /*output: the rearranged table */
{int i;
 int oi;                          /* index to old table */
 int ni;                          /* index to new table */
 int up = 1<<(width);             /* table size */
 for(oi=0; oi<up; oi++)           /*do over all old entries */
  {new_table[ni]=old_table[oi];   /* copy entry */
   for(i=0; i<width; i++)         /*generate next new index */
    {ni ^= armask[i];             /*invert located bit */
     if(ni & armask[i]) break;
    }
  }
}
```

It will be apparent to persons skilled in the art that alternate embodiments can be discerned from the above description. Three independent variations of the preferred embodiments include: (1) varying the value of the new index linearly while determining the value of the old index associated with the new index (in contrast to the preferred embodiment, described above, in which the old index is varied (incremented) linearly while the new index is determined); (2) the index that is varied linearly can begin at the bottom of the table, e.g., with a value of zero, and be incremented or at the top of the table, e.g., with a value of 1111, and be decremented; and (3) the entries in the mask array can be complemented. The operation of all permutations of these three independent variations will be apparent to persons of ordinary skill in the art in light of the detailed description of the preferred embodiment set forth above.

While the present invention has been particularly shown and described with reference to a preferred embodiment, it will be understood by persons skilled in the relevant art that various changes in form and details can be made therein without departing from the spirit and scope of the invention.

What is claimed is:

1. A computer based method for generating signals representing data in a new data structure, the data in the new data structure associated with signals representing a first index, the data in the new data structure being equal to data in an old data structure associated with signals representing a second index, a reordering mask having a plurality of entries, each entry having only one active mask bit and a plurality of non-active mask bits, the computer having a processor and a memory module, the new data structure, the old data structure, the first and second indicies, and the reordering mask stored in the memory module, the method comprising the steps of:
   (a) setting the value of the first index and the value of the second index equal to a first value;
   (b) setting an element of the new array associated with the value of the first index equal to an element of the old array associated with the value of the second index;
   (c) determining a new value for the first index, having the steps of:
      (i) identifying a first entry in said reordering mask as the current entry;
      (ii) identifying a first bit in the first index that corresponds to the active mask bit in the current entry;
      (iii) inverting said first bit;
      (iv) identifying the next entry in said reordering mask as the current entry and repeating steps (ii)–(iv) if said first bit is equal to a second value; and
   (d) modifying the value of the second index if said first bit is not equal to said second value; and
   (e) repeating steps (b) through (e) for each second index signal.

2. The computer based method of claim 1, wherein said second index is modified sequentially in step (d).

3. The computer based method of claim 1, wherein said second index is increased sequentially in step (d).

4. The computer based method of claim 1, wherein said second index is decreased sequentially in step (d).

5. The computer based method of claim 1, wherein said one active mask bit in each mask entry corresponds to a location in the first index that is associated with the first entry.

6. A computer based method for generating signals representing data in a new data structure, the data in the new data structure associated with signals representing a first index, the data in the new data structure being equal to data in an old data structure associated with signals representing a second index, a reordering mask having a plurality of entries, each entry having only one active mask bit and a plurality of non-active mask bits, the computer having a processor and a memory module, the new data structure, the old data structure, the first and second indicies, and the reordering mask stored in the memory module, the method comprising the steps of:
   (a) setting the value of the second index and the value of the first index equal to a first value;
   (b) setting an element of the new array associated with the value of the first index equal to an element of the old array associated with the value of the second index;
   (c) determining a new value for the second index, having the steps of:
      (i) identifying a first entry in said reordering mask as the current entry;
      (ii) identifying a first bit in the second index that corresponds to the active mask bit in the current entry;
      (iii) inverting said first bit;
      (iv) identifying the next entry in said reordering mask as the current entry and repeating steps (ii)–(iv) if said first bit is equal to a second value; and
   (d) modifying the value of the first index if said first bit is not equal to said second value; and
   (e) repeating steps (b) through (e) for each first index signal.

7. The computer based method of claim 6, wherein said first index is modified sequentially in step (d).

8. The computer based method of claim 6, wherein said first index is increased sequentially in step (d).

9. The computer based method of claim 6, wherein said first index is decreased sequentially in step (d).

10. A computer based method for generating signals representing data in a new data structure, the data in the new data structure associated with signals representing a new index, the data in the new data structure being equal to data in an old data structure associated with an old index, said data in the old data structure having a data sequence different from a data sequence of the new data structure corresponding to differences in the new index and the old index, a reordering mask having one entry for every bit representing the old index, each entry having only one active mask bit and a plurality of non-active mask bits, the computer having a processor and a memory module, the new data structure, the old data structure, the new index, the old index, and the reordering mask stored in the memory module, the method comprising the steps of:
   (a) setting the value of the new index and the value of the old index equal to zero;
   (b) setting an element of the new array associated with the value of the new index equal to an element of the old array associated with the value of the old index;
   (c) determining a new value for the new index, having the steps of:
      (i) identifying a first entry in said reordering mask as the current entry;
      (ii) identifying a first bit in the new index that corresponds to the active mask bit in the current entry;
      (iii) inverting said first bit;
      (iv) identifying the next entry in said reordering mask as the current entry and repeating steps (ii)–(iv) if said first bit is equal to a first value; and
   (d) incrementing the value of the old index if said first bit is not equal to said first value; and
   (e) repeating steps (b) through (e) for each old index value.

11. The computer based method of claim 10, wherein said second index is modified sequentially in step (d).

12. The computer based method of claim 10, wherein said second index is increased sequentially in step (d).

13. The computer based method of claim 10, wherein said second index is decreased sequentially in step (d).

14. The computer based method of claim 10, wherein said one active mask bit in each mask entry corresponds to a location in the first index that is associated with the first entry.

15. A computer system for generating signals representing data in a new data structure, comprising:
   a processor;
   a memory module adapted to receive signals from said processor, including:
      a first index associated with data in the new data structure;
      a second index associated with data in an old data structure;

a reordering mask having a plurality of entries, each entry having only one active mask bit and a plurality of nonactive mask bits;

first setting means, adapted to receive signals from said memory module, for setting the value of the first index and the value of the second index equal to a first value;

second setting means, adapted to receive signals from said memory module, for setting an element of the new array associated with the value of the first index equal to an element of the old array associated with the value of the second index;

first determining means, adapted to receive signals from said memory module, for determining a new value for the first index, including:

first identifying means, adapted to receive signals from said memory module, for identifying a first entry in said reordering mask as the current entry;

second identifying means, adapted to receive signals from said memory module, for identifying a first bit in the first index that corresponds to the active mask bit in the current entry;

inverting means, adapted to receive signals from said second identifying means, for inverting said first bit;

second determining means, adapted to receive signals from said memory module, for determining if said first bit is not equal to a second value; and third identifying means, adapted to receive signals from said memory module, for identifying the next entry in said reordering mask as the current entry; and modifying means, adapted to receive signals from said memory module, for modifying the value of the second index if said first bit is not equal to said second value.

16. The computer system of claim 15, wherein said modifying means modifies said second index sequentially.

17. The computer system of claim 15, wherein said modifying means sequentially increases the value of said second index.

18. The computer system of claim 15, wherein said modifying means sequentially decreases the value of said second index.

19. The computer system of claim 15, wherein said one active mask bit in each mask entry corresponds to a location in the first index that is associated with said first entry.

* * * * *